(12) United States Patent
Singhal

(10) Patent No.: US 10,360,639 B2
(45) Date of Patent: Jul. 23, 2019

(54) CONSOLIDATED RECEIPT SYSTEM FOR SALES TRANSACTION DATA FROM MERCHANT SALES TERMINAL TO DATABASE

(71) Applicant: Tara Chand Singhal, Torrance, CA (US)

(72) Inventor: Tara Chand Singhal, Torrance, CA (US)

( * ) Notice: Subject to any disclaimer, the term of this patent is extended or adjusted under 35 U.S.C. 154(b) by 1308 days.

(21) Appl. No.: 14/168,952

(22) Filed: Jan. 30, 2014

(65) Prior Publication Data

US 2015/0213426 A1    Jul. 30, 2015

(51) Int. Cl.
*G06Q 40/00* (2012.01)
*G06Q 20/04* (2012.01)
*G06Q 20/20* (2012.01)

(52) U.S. Cl.
CPC ......... *G06Q 40/12* (2013.12); *G06Q 20/0453* (2013.01); *G06Q 20/209* (2013.01)

(58) Field of Classification Search
None
See application file for complete search history.

(56) References Cited

U.S. PATENT DOCUMENTS

| | | | | |
|---|---|---|---|---|
| 5,642,485 A * | 6/1997 | Deaton | ................ | G06Q 20/387 |
| | | | | 705/14.25 |
| 7,676,409 B1 * | 3/2010 | Ahmad | ................ | G06Q 20/04 |
| | | | | 705/35 |
| 7,729,988 B1 * | 6/2010 | Walker | ................ | G06Q 20/04 |
| | | | | 705/1.1 |
| 2005/0071252 A1 * | 3/2005 | Henning | ................ | G06Q 30/02 |
| | | | | 705/26.1 |
| 2005/0075946 A1 * | 4/2005 | Henning | ................ | G06Q 30/02 |
| | | | | 705/14.51 |
| 2007/0138265 A1 * | 6/2007 | Powell | ................ | G06Q 20/10 |
| | | | | 235/381 |
| 2007/0194108 A1 * | 8/2007 | Kalappa | ................ | G06Q 40/00 |
| | | | | 235/381 |
| 2011/0016536 A1 * | 1/2011 | O'Brien | ................ | G06Q 20/02 |
| | | | | 726/28 |
| 2013/0204886 A1 * | 8/2013 | Faith | ................ | G06Q 30/0631 |
| | | | | 707/756 |
| 2014/0052618 A1 * | 2/2014 | Drozd | ................ | G06Q 20/0453 |
| | | | | 705/39 |
| 2014/0180806 A1 * | 6/2014 | Boal | ................ | G06Q 30/0245 |
| | | | | 705/14.53 |
| 2015/0287005 A1 * | 10/2015 | Hanson | ................ | G06Q 20/10 |
| | | | | 705/40 |

* cited by examiner

*Primary Examiner* — Fatem M Obaid
(74) *Attorney, Agent, or Firm* — Steve Roeder Esq

(57) ABSTRACT

A merchant sales terminal sends a consolidated receipt record of a customer's transaction to a consolidated receipt system in a server database for access by consumer, advertiser, and data miner/researcher. The receipt record is transferred via the internet immediately after the transaction is approved and authorized, to the online server system know as the consolidated receipt system. Here consumers can access their purchase records including merchant name, total amount, and goods/services bought. Furthermore, here also data miners can research sales of a given product/type of product/brand or sales of a merchant/industry/sector/etc.

20 Claims, 15 Drawing Sheets

| Creating a customer id from bankcard data | 100 |
| Creating meta data | 102 |
| Creating item data | 104 |
| Creating a CRR record | 106 |
| Sending CRR record to CRS | 108 |

Figure 7

EXAMPLES OF MERCHANT USE of CRS 10

Query1:

Search fields:
Region; Product code; Time period

Query: Number of items sold

Query 2:

Search fields:
Region; merchant id; product code; time period

Query: number of products sold

Query 3:

Search fields:
Region; product code; time period

Query: lowest price, highest price, average price and Quantity of products sold at each of these prices

Figure 8A

EXAMPLES OF MERCHANT USE of CRS 10

Query 1 result:

Region: Southern Ca
Product Code: SKU3344448929
(Dial Bathroom soap)
Time period: last three months
Items Sold: 247788

Query 2 result:

Region: Southern Ca
Merchant Id: Safeway
Product Code: SKU3344448929
(Dial Bathroom soap)
Time period: last three months
Items Sold: 44457

Query 3 result:

Region: Southern Ca
Product Code: SKU3344448929
(Dial Bathroom soap)
Time period: last three months

| Price: | | Items Sold: |
|---|---|---|
| Lowest Price: $3.22 | | 44457 |
| Highest Price: $3.82 | | 3346 |
| Average Price: $3.57 | | 33346 |

Figure 8B

Web Interface Browser 50

Consolidated Receipt System Consumer Interface 52

Customer can search for their purchase receipt data from all merchants that have subscribed to the CRS. Ask your merchant to do the same 54

Enter Customer ID: 32 JohnS-4455-2233-2010  56

Forming Search Query:  58

Field 1: Time Window  60

Field 2: Region  62

Field 3: Merchant Name 64

Field 3: Product Category 66

Query: 68

70 → Search

Figure 9

EXAMPLES OF Public USE of CRS

Query 1: How much money I spent last year on bathroom products

Search fields:

Primary Search Field:    Customer name 30A   Bankcard Id 30B, 30C, 30D

Customer ID: JoeSmith-4455-0216-4456 (identifies customer and specific bankcard)

Secondary Search Fields:

Region; Product Category title: Bathroom Products; Time period

Primary Query: Search Bathroom Product codes
Secondary Query: Money Spent

Query 2: Which Store I went most often to buy food products

Search fields:

Primary Search Field:    Customer name 30A   Bankcard Id 30B, 30C, 30D

Customer ID: JoeSmith-4422-0216-4477 (identifies customer and specific bankcard)

Secondary Search Fields:

Region; Product Category title: Food Products; Time period

Primary Query: Search Food Product codes
Secondary Query: List of Stores

Figure 10A

EXAMPLES OF Public USE of CRS

Query 3: In which Store I spent the most for consumer electronics last year

Search fields:

Primary Search Field:
    Customer name 30A  Bankcard Id 30B, 30C, 30D
Customer ID: (JoeSmith-4455-0216-4456)(identifies customer and specific bankcard)

Secondary Search Fields:

Region; Product Category title: Consumer Electronics Products; Time period: 12 months Primary Query: Search Electronic Product codes
Secondary Query: List of Stores and Money Spent in each store

Query 4: Find detailed sales receipts for merchant X for the last three months

Search fields:

Primary Search Field:
    Customer name 30A  Bankcard Id 30B, 30C, 30D
Customer ID: (JoeSmith-4455-0216-4456)(identifies customer and specific bankcard)

Secondary Search Fields:

Region; Merchant ID; Time period: 3 months

Primary Query: Search Merchant Id
Secondary Query: List of Stores and Sales Receipts

Figure 10B

CONSOLIDATED RECEIPT SYSTEM FOR SALES TRANSACTION DATA FROM MERCHANT SALES TERMINAL TO DATABASE

CROSS REFERENCE

This application claims priority on Provisional Application Ser. No. U.S. 61/902,286, titled "Apparatus And Method For Consolidated Receipt System For Data Sent From Merchant Sales Terminal To Storage And Access Database" filed on Nov. 10, 2003, by Tara Chand Singhal. The contents of the Provisional Application Ser. No. 61/902,286 are incorporated herein by reference.

FIELD OF THE INVENTION

A consolidated receipt system, in which, a function in a merchant sales terminal sends a consolidated receipt record of a customer's purchase transaction to a consolidated receipt system for later access by consumers, advertisers, and data miner/research companies.

BACKGROUND

There are now-a-days much paper printed in the form of sales receipts after a transaction in the store. Customers take these papers and either throw them away or save them for possible returns/exchanges of goods/services bought. This is, it is believed, cumbersome for the customer as well as burdens the customer with disorganization and difficulty in finding a sales or transaction receipt at the time of return of the goods that have been bought.

Given this current scenario, with these inefficiencies and disorganizations it ultimately hurts consumers and merchants alike. It hurts the consumers in the headache of keeping small pieces of paper and not remembering what they bought in the store. It hurts the merchants for loss of repeat business from customers based on lack of customers being informed and lack of targeted advertising to customer.

It is the objective of the embodiments herein to provide for improved purchase receipt access and storage system that would help different entities, be they a consumer, a merchant, an advertiser, or data miner for market intelligence.

SUMMARY

The embodiments herein relate to improvements in a merchant sales terminal, specifically in sales transaction receipts, using a consolidate receipt system of the embodiments herein.

The consolidated receipt system (CRS) of the embodiments herein, provides for receipt, storage, and access of sales transaction receipts. The sales receipts are generated in a merchant sales terminal after a consumer has made a purchase in a store with a bankcard at a merchant's sales terminal and are then are automatically sent to the CRS and received and stored therein.

The sales receipts are modified by the sales terminal for this purpose of sending them to the CRS and for storage therein and for accomplishing the intended purpose of CRS as detailed later herein. In summary, CRS would be used by consumers, merchants, and data miners in different ways and for different reasons. Some of these ways relate to easier and more convenient data mining. They may also relate to new avenues for advertising.

The CRS and its interfaces may best be understood by comparing how the current sales terminal function and generate and print transaction/sales receipts. Prior art FIG. 1, shows a merchant sales terminal 10 with a display and keyboard 14.

FIG. 1, shows function A 15 for a purchase transaction including scanning goods being purchased with a barcode scanner 13, and function B 16 for a payment via a bankcard that includes swiping a credit card through a bankcard reader 12, sending payment authorization request record to a bankcard authorization network 18, and finally printing a sales receipt via printer 17 which has a list of items bought and a record of payment transaction.

The prior art printed sales receipt is inefficient to carry around for the consumer and presents problems of being lost and forgotten with no way to retrieve the information contained in it.

Further, with the current information security procedures, being mandated by the bankcard industry, the merchants are not allowed to keep customer information from the bankcard and thus merchants loose the ability to learn from their purchasing habits.

As illustrated in FIG. 2, the embodiments described herein provide for a consolidated receipt system 24 that provides for a merchant sales terminal 11 with a consolidated receipt function (CRF) 20 operating in the sales terminal 11.

The CRF 20 sends a sales transaction receipt record of the embodiment described herein to a consolidated receipt system 24 of the embodiments described herein for easy access of sales transaction data by consumers, merchants, advertisers, and data miners.

These and other aspects of the embodiments herein are further described in detail with the help of the accompanying drawings and the description, where similar numbers are used to identify similar features of the embodiments.

BRIEF DESCRIPTION OF THE DRAWINGS

Some of the novel features of the embodiments will be best understood from the accompanying drawings, taken in conjunction with the accompanying description, in which similar reference characters refer to similar parts, and in which:

FIG. 7 is a method diagram of the embodiments of a CRS 24.

FIGS. 8A and 8B are simplified illustration of search queries and their results from a merchant and or a data miner FIG. 9 is simplified illustration of web-based consumer interface with the CRS for search queries from a retail customer.

FIGS. 10A and 10B are simplified illustration of consumer interface with the search queries from a retail customer to CRS.

DESCRIPTION

Figure 1:
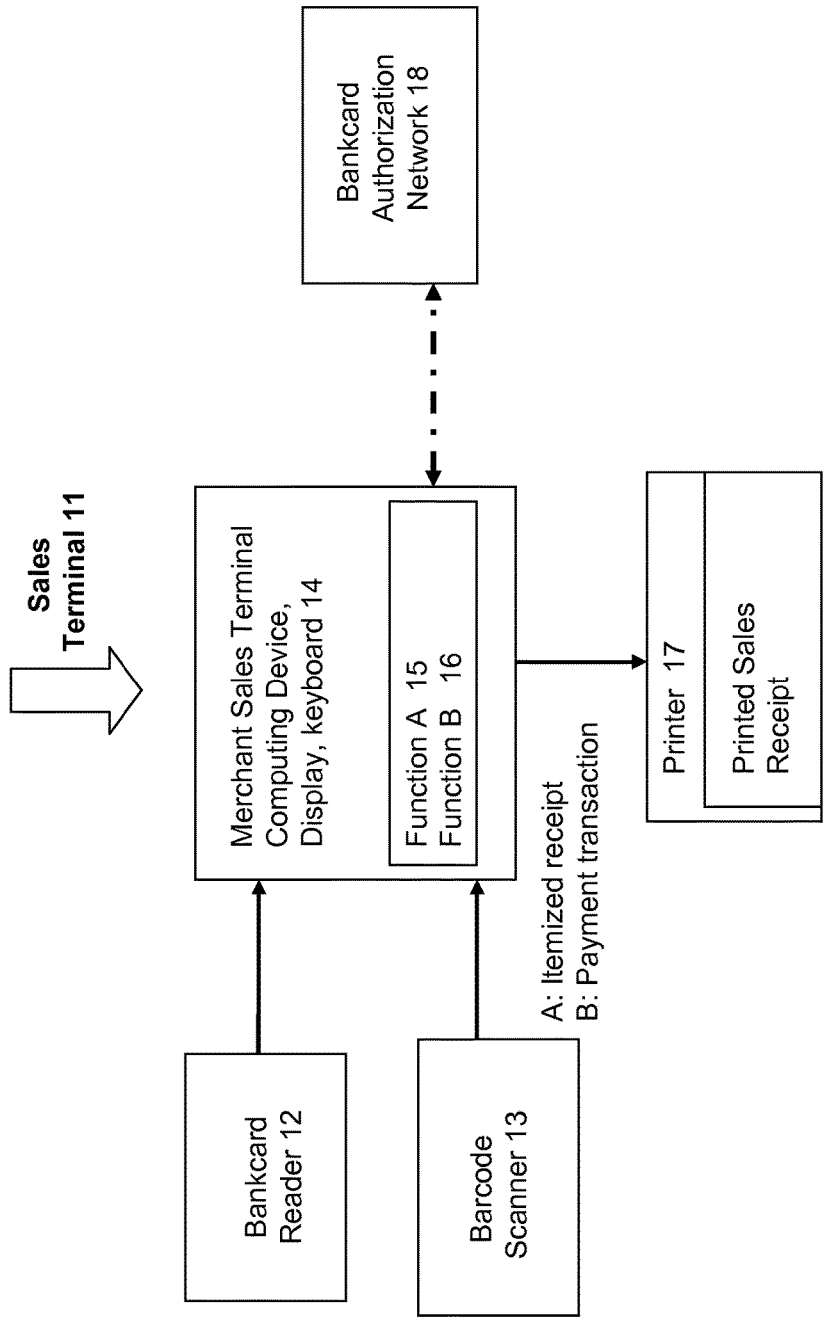
FIG. 1 is a prior art sales terminal of how a purchase transaction is processed at a merchant's sales terminal.
Figure 2:
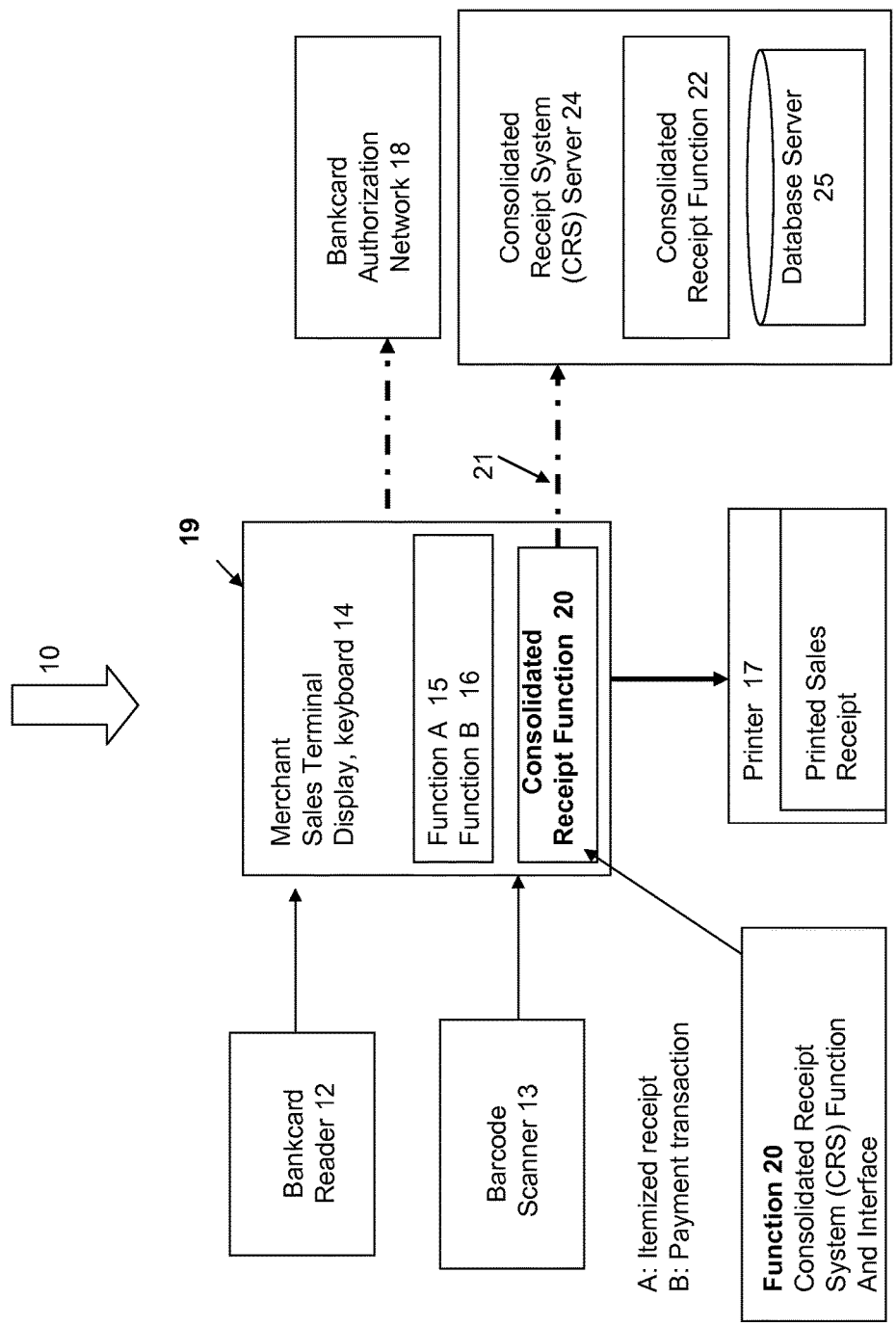
FIG. 2 is a schematic of how a purchase transaction would be processed with embodiments of the current invention, which includes a third party consolidated receipt system.

As illustrated with the help of FIG. 2, consolidated receipt system 10 has a sales terminal 19 of the embodiments herein. The sales terminal 19 has a consolidated receipt function (CRF) 20 that interfaces 21 with a consolidated receipt system server 24 and its consolidated receipt function 22 over a global computer and communication network (not shown).

CRF 20 in sales terminal 19 working in conjunction with the CRF 22 in CRS servers 24, for a sales transaction at the merchant sales terminal 19, provides a convenient record keeping of purchases made and goods/services bought by a customer of a merchant at the merchant sales terminal 19. The merchant sales terminal 19 may be a physical terminal in a store or an online terminal of an online merchant, or a mobile terminal such as that of a smart phone or tablet computer.

The CRS function 20 in the merchant sales terminal 19 creates a record of the sales transaction according to the format as described later herein and sends to CRS 24.

The CRS 10 makes it possible for consumers to view their purchase transaction history, as well as for merchants and third party advertisers to post advertisements and coupons, as well as for data miners to collect statistical data of merchants/industries/sectors and products/types of products sold.

Not keeping records of this information means loss of valuable data for consumers, merchants, and data miners. Thus maintaining these records is of interest and value to every party involved.

This information is contained in a CRS server 24 online server database 25 in an organized fashion with any number of search fields and queries possible for extracting the desired information.

These and other aspects of the embodiments are described herein where the headings are provided for reader convenience.

CRF 20 in Sales Terminal 19

Figure 3A:
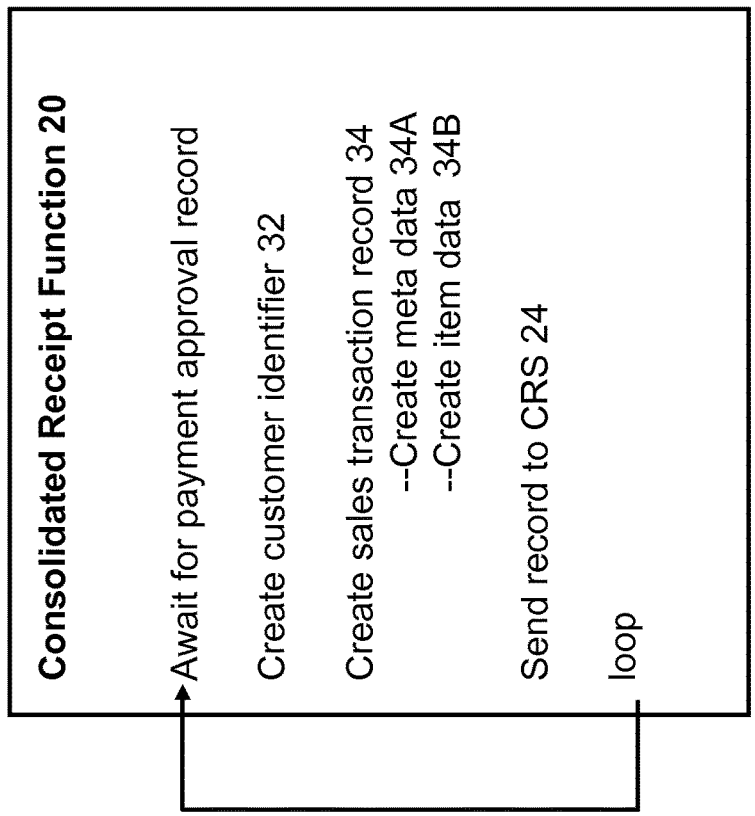
FIG. 3A illustrates an embodiment of a function diagram of a consolidated receipt function in a merchant sales terminal.
Figure 3B:
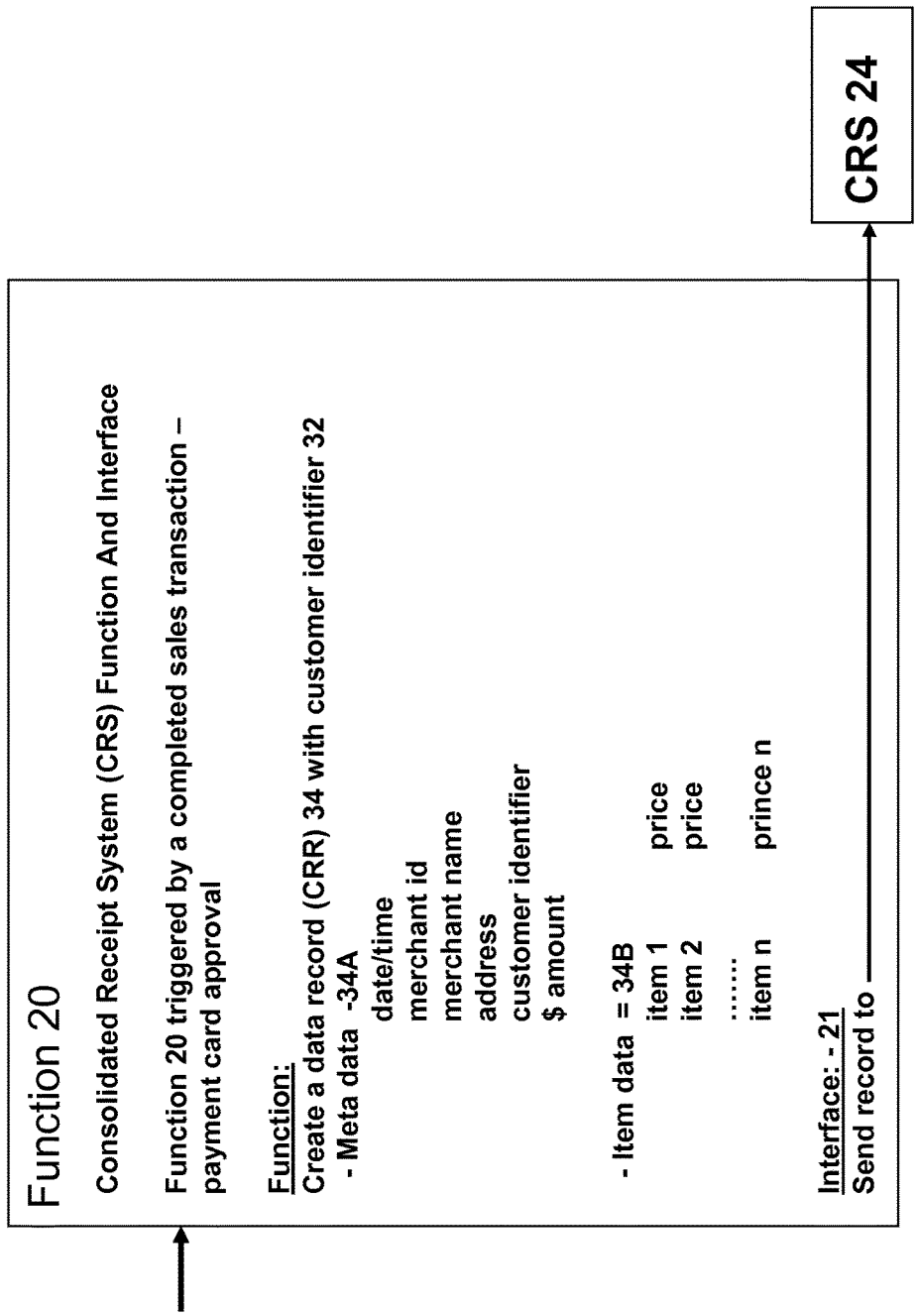
FIG. 3B illustrates a function diagram of a consolidated receipt function in a merchant sales terminal.

As illustrated with the help of FIGS. 2, 3A and 3B, the function 20 in the merchant sales terminal 19 is triggered by a completed sales transaction as indicated by a bankcard approval record received from the card authorization network 18.

As illustrated in FIGS. 3A and 3B, the function 20 creates a data record 34 which includes meta data 34A of date/time, merchant id, merchant name, merchant address, customer identifier 32, and $ amount as well as item data 34B, that is each item bought and its corresponding price. The item data 34B may include UPC code for the product, a description as well as the price of that item at which it had been sold. An interface 21 between the merchant sales terminal 19 and CRS server 24 then sends a record of this information to the CRS server 24.

Consolidated Receipt System (CRS) Server 24

Figure 4A:
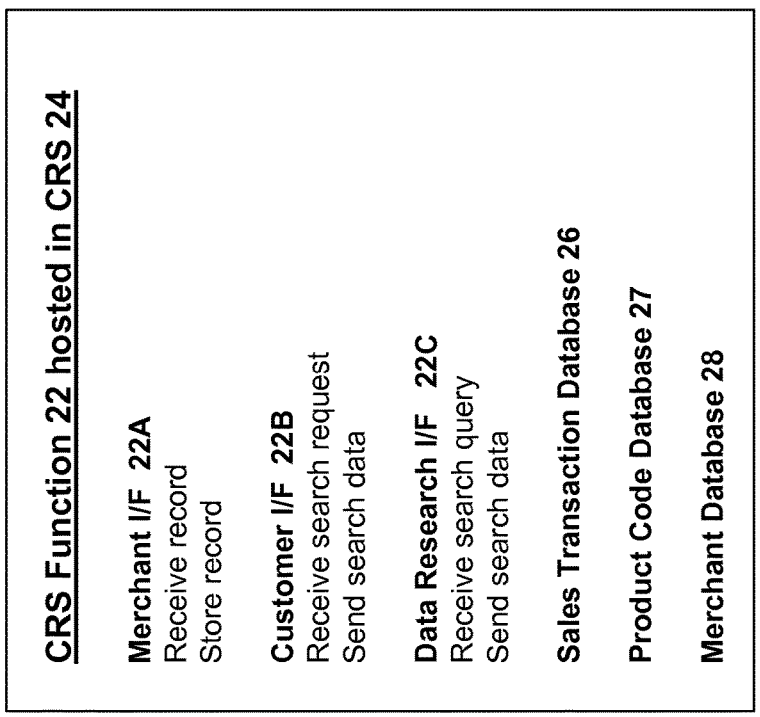
FIG. 4A illustrates an embodiment of interfaces of a consolidated receipt function in a consolidated receipt system server.
Figure 4B:
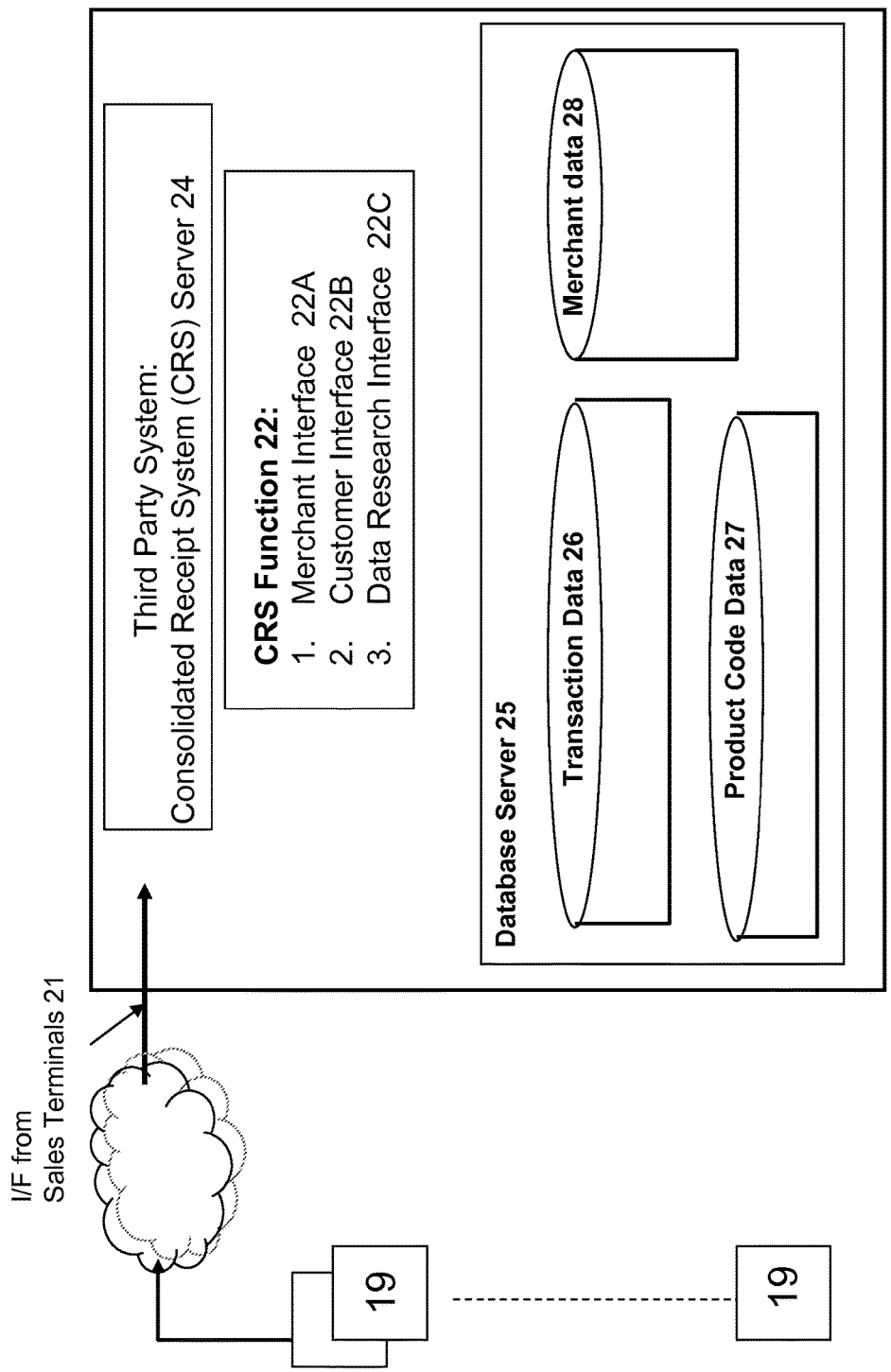
FIG. 4B illustrates a block diagram of a third party system for CRS

CRS server 24 is illustrated with the help of FIGS. 4A and 4B. FIG. 4A illustrates the functions, databases and interfaces of CRS server 24. FIG. 4B illustrates the CRS server 24 on the global computer network.

The CRS server 24 is a server with CPU, memory and data storage that is interfaced with the global computer network also known as Internet. The CRS server 24 has one or more database servers that may be co-located or located in different locations. Multiple database servers may serve different regions of the USA or different countries.

The server 24 has the processing and storage ability to receive large volume of data from merchants all over the USA as well as globally that includes sales transaction records of sales transactions that are paid via a bankcard, irrespective of the type of bankcard. And be able to store such data in perpetuity.

As shown in FIG. 4A, the CRS server 24 has a CRS function 22, a merchant interface 22A, a customer interface 22B, and a data research interface 22C. CRS server 24 managed database server, as an illustration, has three different databases 26, 27, and 28. There may be more or other databases and these are not ruled out.

As illustrated in FIG. 4B, CRS server 24 ad its database server 25 is a third party system that is owned and operated by a business entity that is independent of the merchants and the card-issuing banks.

CRS server 24 hosts the CRS function 22 and sales transaction database 26 and merchant database 28. In addition CRS 24 also hosts a SKU product code and item description database 27.

CRS server 24 is based on prior art features of such a server system customized to the unique functions and applications of the CRS 24 as described herein. CRS server 24 is capable of receiving and storing a high volume of sales transaction data records from merchant anywhere is the USA.

As a simplified example, if there are one million merchants in the USA and each merchant engages in one million transactions on an annual basis, then the CRS server 24 is capable of receiving one billion sales records annually. Prior art provides servers, application software, database software and database servers that are capable of receiving and storing such large volume of sales transactions on an annual basis.

The transaction data 26 is stored along with the merchant data 28 in the CRS 24. Database 27 is used to map SKU product codes to item description and vice versa for some search queries, for example from merchants and consumers.

The CRS function 22 in CRS 24 includes receiving the record, storing the record, allowing customers to interface with CRS 24, allowing merchants to interface with CRS 24, and allowing advertisers and data miners to interface with CRS 24. CRS Function 22 allows a merchant to interface with CRS 24, a customer to interface with CRS 24, or an advertiser/data miner to interface with CRS 24.

Merchant Interface 22A

As illustrated in FIG. 4A, there are two different interfaces that may be applicable to merchants. What has been described is a one way interface to CRS 24 from sales terminals 19. In addition there may be a separate interface (not shown) for merchants themselves for them to access consolidated sales data for their own sales. As illustrated later with the help of FIGS. 8A and 8B, the (not shown) merchant interface may be used by a merchant to search the CRS 24 databases.

FIG. 8A provides simplified illustrations of different search queries and FIG. 8B provides simplified illustration of search query results from the CRS 24. Search queries by way of simplified illustration, may include:

Query1:
Search fields:
Region; Product code; Time period
Query: Number of items sold
Query 1 Result:
Region: Southern Ca
Product Code: SKU334448929
(Dial Bathroom soap)
Time period: last three months
Items Sold: 247788
Query 2:
Search fields:
Region; merchant id; product code; time period
Query: number of products sold
Query 2 Results:
Region: Southern Ca
Merchant Id: Safeway
Product Code: SKU334448929
(Dial Bathroom soap)
Time period: last three months
Items Sold: 44457
Query 3:
Search fields:
Region; product code; time period
Query: lowest price, highest price, average price and
Quantity of products sold at each of these prices
Query 3 Results:
Region: Southern Ca
Product Code: SKU334448929
(Dial Bathroom soap)
Time period: last three months

| Price: | Items Sold: |
|---|---|
| Lowest Price: $3.22 | 44457 |
| Highest Price: $3.82 | 3346 |
| Average Price: $3.57 | 33346 |

Customer Interface 22B

A customer via this interface is able to interface with CRS 24 to access, search, and retrieve his personal sales transaction data. The search and retrieval may be organized by merchant, date range, and items that he may have purchased over a period of time. Other types of searches are possible and not ruled out. The interface is a traditional prior art based web interface. The retrieval of sales transaction information may include merchant data such as merchant name, logo, and tagline from merchant database 28.

A customer may choose to search for a single sales transaction and print it and may use it as a record of a purchase from a merchant for a return or exchange with the merchant. Such a receipt has all the required information that a merchant may need for processing a return/exchange transaction.

FIG. 9 provides a simplified illustration of a web-based consumer interface 50 to the CRS 10. The web-based interface 50 provides for a title 52 and legend stating the purpose of the interface 50. This may additionally include privacy policies.

A space 56 for entry of customer id 32 as had been illustrated earlier with the help of FIG. 5 is provided. A space 58 is provided for forming a search query. The search query space 58 provide for one or more of search fields that may include time window 60, region 62, merchant 64 and product category 66.

Then the query 68 is provided which can be a free form search query using any of the fields above. The query is using one or more search fields to query sales data that would be relevant to a consumer. Some illustrative examples of such queries are illustrated with the help of FIGS. 10A and 10B.

After the query 68 has been stated, search button 70 is activated to search the CRS databases for this data and is displayed in a webpage.

FIGS. 10A and 10B provide simplified illustrations of different search queries, from the CRS 24, that a retail customer may likely use. As a simplified illustration: Query1: How much money I spent last year on bathroom products; Which Store I went most often to buy food products; Query3: In which Store I spent the most for consumer electronics last year; and Query4: Find detailed sales receipts for merchant X for the last three months.

There may be many different types of queries and the above provides only a simplified illustration of the ability for a consumer to form search queries for sales data that may be relevant to him/her. The queries are driven by the customer Id 32. There may be more than one customer Id as each customer ID is bankcard based.

Data Research Interface 22C

A data research entity via this interface is able to interface with CRS 24 to access, search, and retrieve analytical data. This search and retrieval may be organized by classes of merchants, date ranges, products, and types of products that have been sold. Other types of searches are possible and not ruled out. The interface is a traditional prior art based web interface.

This data research interface 22C may also be used to conduct historical research related to purchase habits of people that may be used by sociologists. Some searches may take long time and may be conducted in off-time.

Sales Transaction Database 26 in CRS 24

Figure 6A:
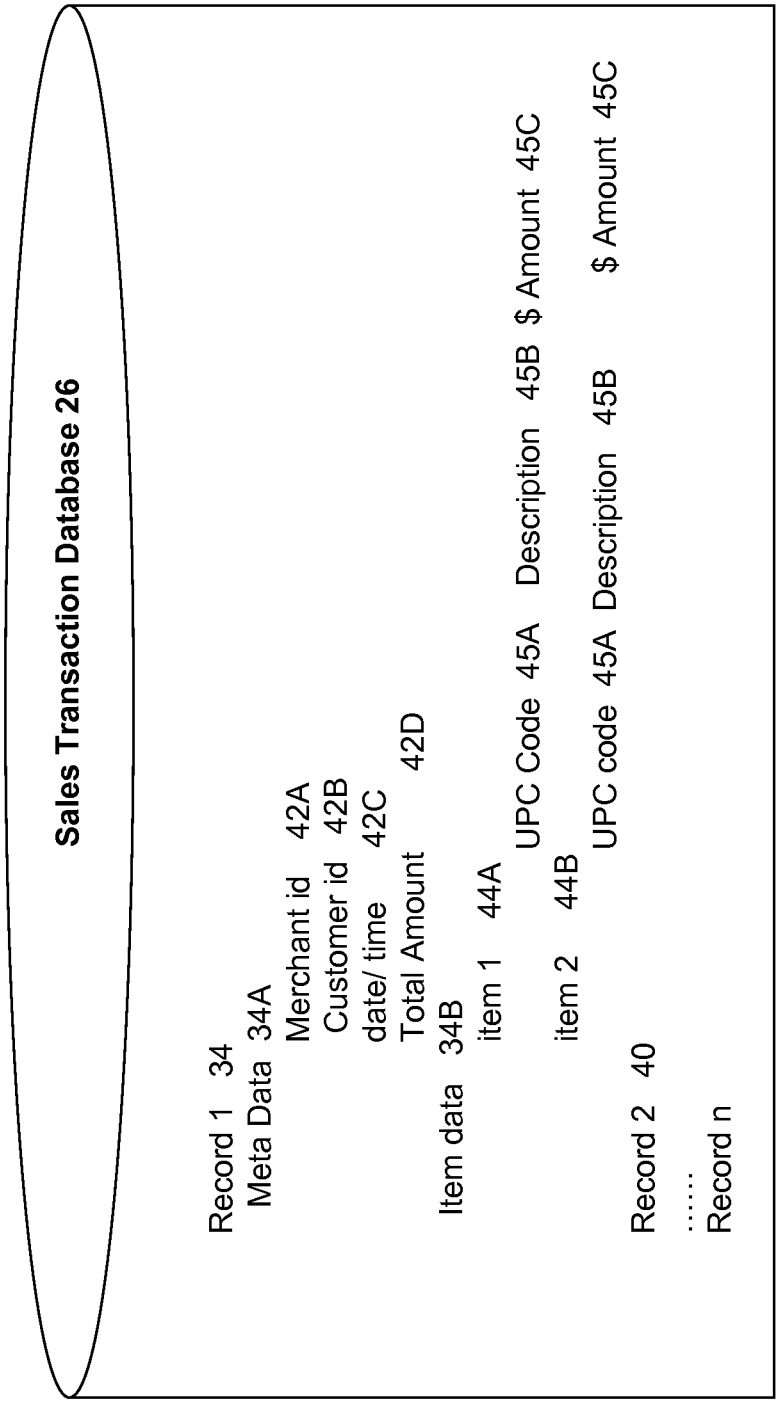
FIG. 6A is a sales transaction database 26 that is present in CRS 24.

As illustrated in FIG. 6A, the sales transaction database in CRS 24 stores record of sales transactions. A record 34 of such a sales transaction may include Meta data 34A and item data 34B.

The meta data 42 may include merchant id 42A, a customer id 42B, date/time 42C and total amount 42D. The merchant id. Merchant id is a 9 digit number that is assigned to the merchant for bankcard processing by the bankcard industry. In the merchant database 26, the merchant id maps to the merchant name, logo, and tagline. These items may be provided by the merchant and for this purpose the merchant is provided access to the CRS 20. Alternatively others may provide such information.

The item data 44 may include for an item 44A, UPC code 45A, item description 45B and dollar amount 45C.

Product Code Database 27 in CRS 24

A product code database 27 is maintained in the CRS 24 and maps product codes to product item description as well as item description to product code and may be organized by product categories making it easier to search and retrieve product code data. The product codes have been standardized by the industry organization and may be called SKU codes. The database 27 in CRS 24 serves the purpose of mapping codes to item descriptions.

Merchant Database 28 in CRS 24

Figure 6B:
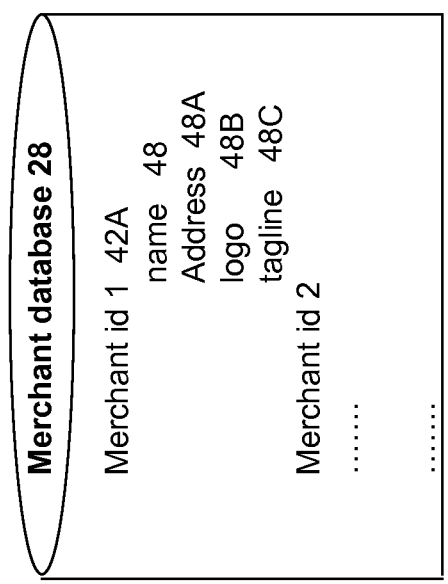
FIG. 6B is a merchant database 28 that is present in CRS 24.

As illustrated in FIG. 6B, the merchant data 28 in the CRS 24 may include the merchant id 42A. Merchant id is a 9 digit number that is assigned to the merchant for bankcard processing by the bankcard industry. In the merchant database 28, the merchant id 42A maps to the merchant name 48, address 48A, logo 48B and a tagline 48C. These items may be provided by the merchant and for this purpose the merchant is provided access to the CRS 20. Alternatively others may provide such information.

Customer Identifier 32

Figure 5:
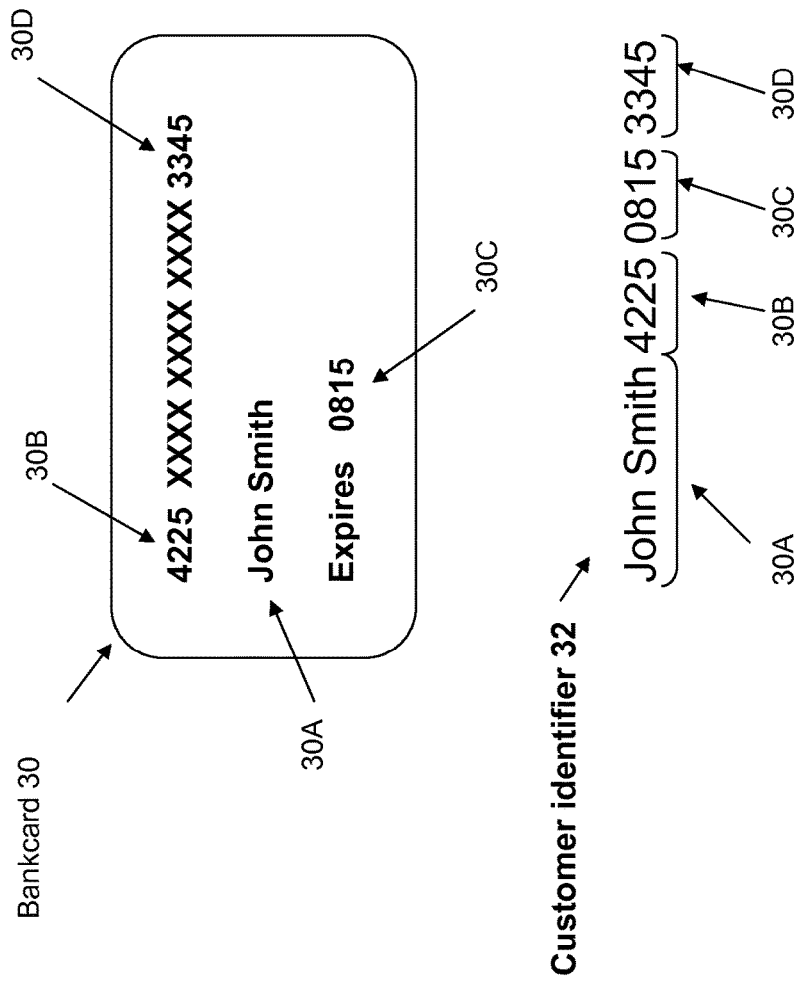
FIG. 5 is an illustration of customer id of the embodiments herein that is derived from a bankcard data.

As illustrated in FIG. 5, a bankcard 30 that may be a credit card or debit card has a customer name 30A, bank code 30B, expiration date 30C, and last four digits 30D of bank card number.

As illustrated in FIG. 5, the customer id 32 is created by the CRF function 20 in the sales terminal 19 for each sales transaction at the time of the sales transaction itself. That is the customer id is not pre-stored in the merchant sales terminal. Customer id 32 is created as some combination of a customer name and partial card number and these are extracted from the bankcard that was used for the payment transaction. It is believed that the customer id 32 does not provide privacy information on the customer. When the payment is made by cash, the CRF does not operate.

The customer id 32 may include some combination of customer name, bank code 30B, expiration date 30C, and last four digits of bank card 30D.

Method of Operation

As illustrated in FIG. 7, a method of operation in a sales terminal 19 may have the following steps where all the steps may not be used or used in the order specified:

At step 100, creating a customer identifier from bankcard data.

At step 102, creating meta data for the sales transaction.

At step 104, creating list of itemized sales data.

At step 106, creating a consolidated receipt record (CRR) 35 using data items in steps 100, 102 and 104.

At step 108, sending CRR 35 record to CRS 24.

A merchant sales terminal for use with a third party consolidated receipt system (CRS) has the sales terminal that has a computing device that is interfaced with a bankcard scanner, product bar code scanner, a printer, and an interface to a card authorization network for processing payment transactions pursuant to sales transaction at the sales terminal.

The computing device of the sales terminal has a consolidated receipt function (CRF) that on completion of processing of payment transactions pursuant to sales transaction creates consolidated receipt records (CRR), each CRR has (i) meta data and (ii) itemized sales items, the meta data has at least a merchant id, a date and time, a payment amount, and a customer identifier.

The CRF interfaces with a one-way interface to a server on a global network of computers to send and sends the CRR to the third party consolidated receipt system (CRS).

The customer identifier is created for each sales transaction by the sales terminal for inclusion in the CRR and the customer identifier is created with a customer data that is already present on a bankcard itself. The customer identifier is created and includes a customer name appended with one or more of (i) last four digits of bankcard (ii) four digits of expiration date, and (iii) first four digits of bankcard. Alternatively, the customer identifier is created and includes a customer name initials appended with one or more of (i) last four digits of bankcard (ii) four digits of expiration date, and (iii) first four digits of bankcard.

A customer-specific sales transaction record identifier generated in a sales terminal has a sales terminal that accepts bankcards for payment transactions. The terminal has a function to create a customer-specific sales transaction identifier for each sales transaction using elements from data present on a bankcard, including at least the customer name and some combination of 4 digits including bank code, expiration date, and last 4 digits that uniquely identify a sales transaction record, when coupled with other meta data. The function uses the identifier to identify a sales transaction record for the purpose of tagging such record for storage in a third party system.

The transaction identifier is created with each sales transaction for inclusion in the CRR and the customer id is created with a customer data that is already present on the bankcard itself. The transaction identifier is created and includes a customer name appended with one or more of (i) last four digits of bankcard (ii) four digits of expiration date, and (iii) first four digits of bankcard in any sequence.

Alternatively, the transaction identifier is created and includes a customer name initials appended with one or more of (i) last four digits of bankcard (ii) four digits of expiration date, and (iii) first four digits of bankcard. Yet Alternatively, the transaction identifier is created and includes a customer name initials appended with at least (i) last four digits of bankcard (ii) four digits of expiration date, and (iii) first four digits of bankcard.

A consolidated receipt system (CRS) on a global computer network has a high capacity processing and storage system. The CRS has a receiving only interface from merchants' sales systems for receiving only a consolidated receipt record (CRR) with a meta data and an itemized content, the meta data has at least a merchant id, a date and time and payment amount, and a customer id for a completed sales transaction and storing the CRR in a database of the CRS, the database provides search and sort capabilities.

The CRS has an interface with customers for searching and reviewing their consolidated sales transaction data. The CRS has an interface with data research companies for creating data analytics. The CRS has an interface with merchants for creating merchant specific data analytics.

The CRS has a sales terminal resident in a computing device has a consolidated receipt function (CRF) that on completion of a payment transaction as in (a) creates a consolidated receipt record (CRR) with a meta data and itemized content, the meta data has at least a merchant id, a date and time and payment amount, and a customer identifier.

The CRF interfaces with on a one way interface and sends the CRR to a third party consolidated receipt system (CRS), a server on a global network of computers.

The CRS have a receiving only interface from merchants' sales systems for receiving only a consolidated receipt record (CRR) with a meta data and an itemized content, the meta data has at least a merchant id, a date and time and payment amount, and a customer id for a completed sales transaction.

The customer id is created with each sales transaction for inclusion in the CRR with a modification of the data that is present on the bankcard itself, and includes a customer name appended with one or more of (i) last four digits of bankcard (ii) four digits of expiration date, and (iii) first four digits of bankcard.

The consolidated receipt system (CRS) is a high capacity storage system that provides database search and sort capabilities.

In summary, Consolidated Receipt System 0 provides a sales terminal 19 with a Consolidated Receipt Function 20, a server 24 with Consolidated Receipt Function 22 in the server 24. The sales terminal 19 has a consolidated receipt function (CRF) 20 that on completion of a payment transaction creates a consolidated receipt record (CRR) 35 with a meta data and itemized content. The meta data has at least a merchant id, a date and time and payment amount, and a customer id. The CRF 20 interfaces with a one way interface to CRS 24 and sends the CRR 34 to a third party consolidated receipt system (CRS) 24, a server on a global network of computers.

The hardware, software and communication network technology underlying server 24 and database server 25 is considered prior art except for the purpose and application specifically used in the embodiments herein. Further the software technology underlying software of the embodiments herein, is considered prior art except for the specific purpose, function, and interfaces of the embodiments herein.

While the particular embodiments, as illustrated herein and disclosed in detail are fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A merchant sales terminal for use with a third party consolidated sales receipt archival system, comprising:
   a. the merchant sales terminal has a computing and communication device that is interfaced to a card authorization network for processing payment transactions pursuant to sales transaction at the sales terminal;
   b. the computing and communication device of the sales terminal has a CPU, a memory, and a consolidated sales receipt archival (CSRA) logic, wherein the CSRA logic is stored in the memory and operating in the CPU and, wherein the CSRA logic, on completion of processing of a payment transactions from a customer pursuant to a sales transaction, creates a consolidated receipt record (CRR), wherein the CRR has (i) meta data and (ii) a list of itemized sales items, wherein the meta data has at least a merchant id, a date and time, a payment amount, and a customer identifier;
   c. the CSRA logic with a one-way interface on a global network of computers to the third party consolidated sales receipt archival system sends the CRR, thereby enabling search and retrieval of sales receipts by the customer from the consolidated sales receipt archival system.

2. The merchant sales terminal as in claim 1 further comprising:
   the customer identifier is created for each sales transaction by the CSRA logic for inclusion in the CRR and the customer identifier is created with a customer data that is already present on a bankcard itself.

3. The merchant sales terminal as in claim 2, further comprising:
   the customer identifier is created and includes a customer name appended with one or more of (i) last four digits of bankcard (ii) four digits of expiration date, and (iii) first four digits of bankcard.

4. The merchant sales terminal as in claim 2, further comprising:
   the customer identifier is created and includes a customer name initials appended with one or more of (i) last four digits of bankcard (ii) four digits of expiration date, and (iii) first four digits of bankcard.

5. A merchant sales terminal for use with a third party consolidated sales receipt archival system, comprising:
   a. the merchant sales terminal has a computing and communication device for processing payment transactions from a bankcard, wherein the computing and communication device has a CPU, a memory, and a consolidated sales receipt archival (CSRA) logic, wherein the CSRA logic is stored in the memory and operating in the CPU, and wherein the CSRA logic on completion of processing of a payment transaction from a customer pursuant to a sales transaction, creates a consolidated receipt record (CRR);
   b. CSRA logic has a function to create a customer-specific sales transaction identifier for each sales transaction using elements from data present on the bankcard, including at least the customer name and some combination of 4 digits including bank code, expiration date, and last 4 digits, that uniquely identify a sales transaction record, when coupled with other meta data;
   c. the function uses the identifier to identify a sales transaction record for the purpose of tagging such record for storage in the third party system.

6. The record identifier as in claim 5 further comprising:
   the transaction identifier is created with each sales transaction for inclusion in the CRR and the customer id is created with a customer data that is already present on the bankcard itself.

7. The record identifier as in claim 5 further comprising:
   the transaction identifier is created and includes a customer name appended with one or more of (i) last four digits of bankcard (ii) four digits of expiration date, and (iii) first four digits of bankcard in any sequence.

8. The identifier as in claim 5 further comprising:
   the transaction identifier is created and includes a customer name initials appended with one or more of (i) last four digits of bankcard (ii) four digits of expiration date, and (iii) first four digits of bankcard.

9. The identifier as in claim 5 further comprising:
   the transaction identifier is created and includes a customer name initials appended with at least (i) last four digits of bankcard (ii) four digits of expiration date, and (iii) first four digits of bankcard.

10. A consolidated receipt system (CRS) on a global computer network, comprising:
    a. the consolidated receipt system (CRS) has a high capacity processing and storage system for archiving sales transaction records generated in sales terminals;
    b. the CRS has a receiving only interface from merchants' sales systems for receiving a consolidated receipt record (CRR) with a meta data and an itemized content, the meta data has at least a merchant id, a date and time and payment amount, and a customer id for a completed sales transaction;
    c. a database management system stores the CRR in a database of the CRS, and provides search and sort capabilities.

11. The CRS of claim 10, comprising:
    the CRS has an interface with customers for searching and reviewing their consolidated sales transaction data.

12. The CRS of claim 10, comprising:
    the CRS has an interface with data research companies for creating data analytics.

13. The CRS of claim 10, comprising:
    the CRS has an interface with merchants for creating merchant specific data analytics.

14. The CRS of claim 10, comprising:
    a. a sales terminal resident in a computing device has a consolidated receipt function (CRF) that on completion of a payment transaction creates a consolidated receipt record (CRR) with a meta data and itemized content, the meta data has at least a merchant id, a date and time and payment amount, and a customer id;

b. the CRF interfaces with on a one way interface and sends the CRR to a third party consolidated receipt system (CRS), a server on a global network of computers;

c. the CRS have a receiving only interface from merchants' sales systems for receiving only a consolidated receipt record (CRR) with a meta data and an itemized content, the meta data has at least a merchant id, a date and time and payment amount, and a customer id for a completed sales transaction.

15. The CRS as in claim 10 further comprising:

the customer id is created with each sales transaction for inclusion in the CRR with a modification of the data that is present on the bankcard itself, and includes a customer name appended with one or more of (i) last four digits of bankcard (ii) four digits of expiration date, and (iii) first four digits of bankcard.

16. The consolidated receipt system (CRS) as in claim 10, comprising:

a high capacity storage system that provides database search and sort capabilities.

17. A method for merchant sales terminal for use with a third party consolidated sales receipt archival system, comprising the steps of:

a. providing the merchant sales terminal that has a computing and communication device and an interface to a card authorization network for processing payment transactions pursuant to sales transaction at the sales terminal;

b. providing the computing and communication device of the sales terminal with a CPU, a memory, and a consolidated sales receipt archival (CSRA) logic, wherein the CSRA logic is stored in the memory and operating in the CPU and, wherein the CSRA logic, on completion of processing of a payment transaction from a customer pursuant to a sales transaction, creates a consolidated receipt record (CRR), wherein the CRR has (i) meta data and (ii) a list of itemized sales items, wherein the meta data has at least a merchant id, a date and time, a payment amount, and a customer identifier;

c. providing the CSRA logic with a one-way interface on a global network of computers to the third party consolidated sales receipt archival system sends the CRR, thereby enabling search and retrieval of sales receipts by the customer from the consolidated sales receipt archival system.

18. The method for the merchant sales terminal as in claim 1 further comprising the steps of:

creating the customer identifier for each sales transaction by the CSRA logic for inclusion in the CRR and the customer identifier is created with a customer data that is already present on a bankcard itself.

19. The method for the merchant sales terminal as in claim 1 further comprising the steps of:

creating the customer identifier that includes a customer name appended with one or more of (i) last four digits of bankcard (ii) four digits of expiration date, and (iii) first four digits of bankcard.

20. The method for the merchant sales terminal as in claim 1 further comprising the steps of:

creating the customer identifier which includes a customer name initials appended with one or more of (i) last four digits of bankcard (ii) four digits of expiration date, and (iii) first four digits of bankcard.

* * * * *